No. 668,417. Patented Feb. 19, 1901.
N. B. ROSS.
VOTING MACHINE.
(Application filed Jan. 20, 1900.)

(No Model.) 7 Sheets—Sheet 1.

Fig. 1.

Witnesses

Inventor
Napoleon B. Ross
By W. W. Dudley & Co.
Attorneys

No. 668,417. Patented Feb. 19, 1901.
N. B. ROSS.
VOTING MACHINE.
(Application filed Jan. 20, 1900.)
(No Model.) 7 Sheets—Sheet 4.

Witnesses

Inventor
Napoleon B. Ross.
By W. W. Dudley
Attorneys

No. 668,417. Patented Feb. 19, 1901.
N. B. ROSS.
VOTING MACHINE.
(Application filed Jan. 20, 1900.)
(No Model.) 7 Sheets—Sheet 5.

Witnesses
Inventor
Napoleon B. Ross
By W. W. Dudley
Attorneys

No. 668,417. Patented Feb. 19, 1901.
N. B. ROSS.
VOTING MACHINE.
(Application filed Jan. 20, 1900.)
(No Model.) 7 Sheets—Sheet 6.

Witnesses
Inventor
Napoleon B. Ross
By W. W. Dudley
Attorneys

No. 668,417. Patented Feb. 19, 1901.
N. B. ROSS.
VOTING MACHINE.
(Application filed Jan. 20, 1900.)
(No Model.) 7 Sheets—Sheet 7.

Inventor
Napoleon B. Ross
By W. W. Dudley & Co.
Attorneys

Witnesses

UNITED STATES PATENT OFFICE.

NAPOLEON B. ROSS, OF GILBOA, OHIO, ASSIGNOR TO THE ROSS VOTING MACHINE COMPANY, OF WEST VIRGINIA.

VOTING-MACHINE.

SPECIFICATION forming part of Letters Patent No. 668,417, dated February 19, 1901.

Application filed January 20, 1900. Serial No. 2,163. (No model.)

*To all whom it may concern:*

Be it known that I, NAPOLEON B. ROSS, a citizen of the United States, residing at Gilboa, in the county of Putnam and State of Ohio, have invented certain new and useful Improvements in Voting-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention is directed to improvements on the voting-machine which forms the subject-matter of Letters Patent No. 612,573, granted to me October 18, 1898.

The present improvements while particularly designed for application to machines in which registrations of votes may be effected are also adaptable for use in connection with registering machines or appliances of other types, and I therefore wish it understood that I do not limit myself to the specific application shown and hereinafter described.

One of the objects of my present improvements is the production of a registering-machine by which improper registrations made either through manual acts or through disorder of the parts are entirely prevented, the machine to this end being constructed to have absolute precision of action and durability and being provided with reliable safeguards against persons who may seek both during and after the manipulations to change the true result.

Another object or purpose of my improvements is the simplification of the operation of registering-machines, whereby persons of even less than ordinary intelligence are enabled to perform the proper manipulations.

Still another object of the invention is the production of a simply and comparatively inexpensively constructed machine, certain of the parts of which are made to be readily taken apart for transportation or storage and as easily again set up for operation.

My improvements are, as above stated, more particularly adapted for embodiment in machines for effecting the registration of votes for candidates for office, the machine to this end including a booth, which may be occupied by but one person at a time and which is constructed to obtain absolute secrecy of the ballot.

A voting-machine constructed in accordance with my invention contains provisions by which votes may be cast for candidates for all classes of office and for all kinds of nominations, whether party, personal, or independent, and the necessary manipulations are effected solely by the voter, no exterior agent being employed in the accomplishment of the result.

Another advantage possessed by my machine lies in the provision of means by which a voter of limited rights while permitted to cast a vote or votes for one or more candidates for certain offices may be prevented from voting for the remainder of the candidates.

The nature of my improvements will be readily comprehended by reference to the following detailed description and to the accompanying drawings, in which—

Figure 1:
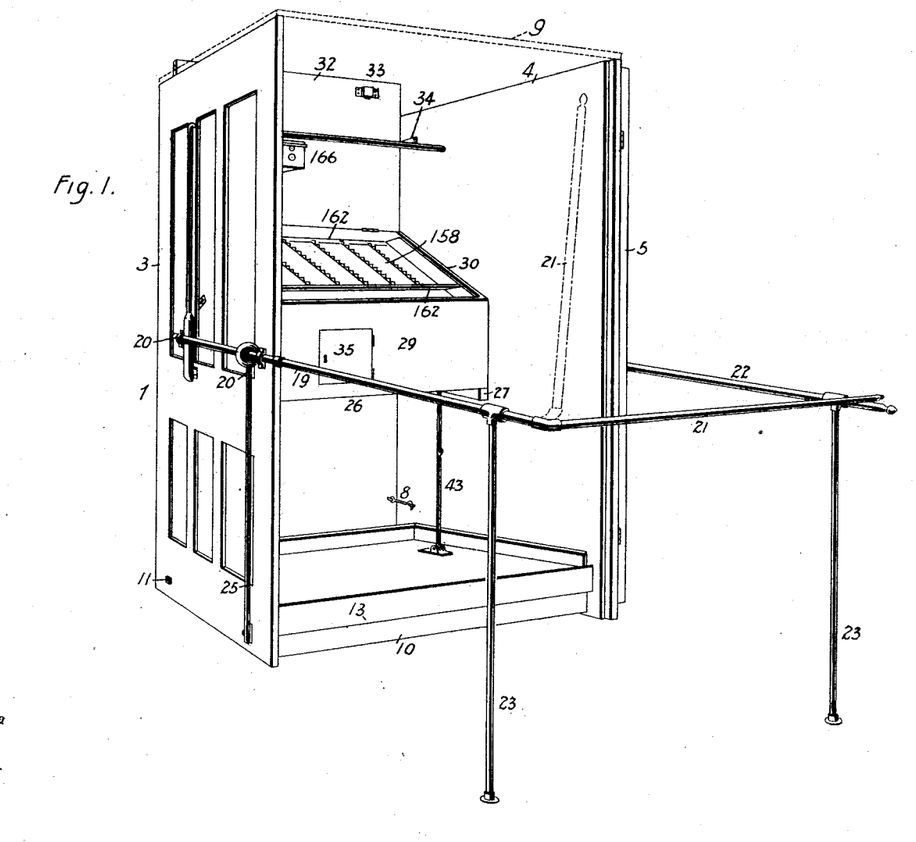
Figure 1 is a perspective view of a voting-machine embodying my improvements.
Figure 2:
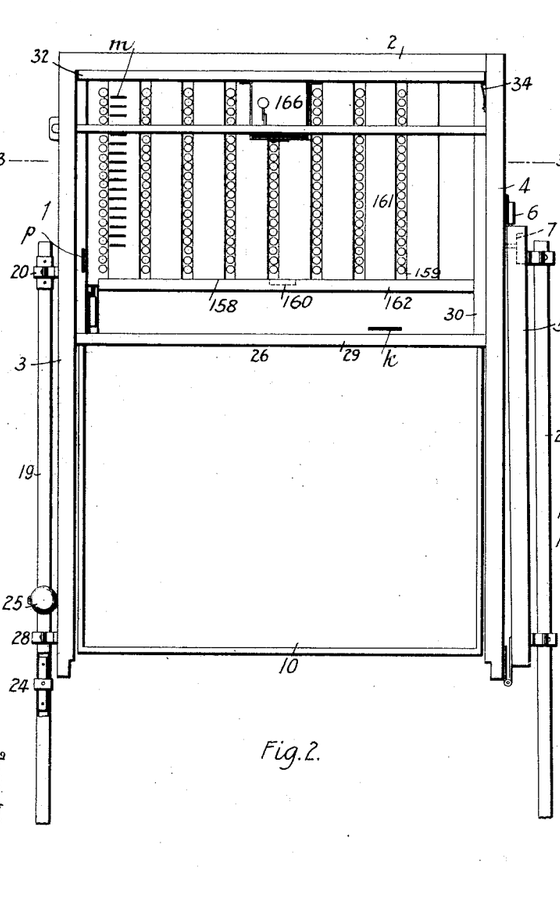
Fig. 2 is an enlarged top plan view.
Figure 3:
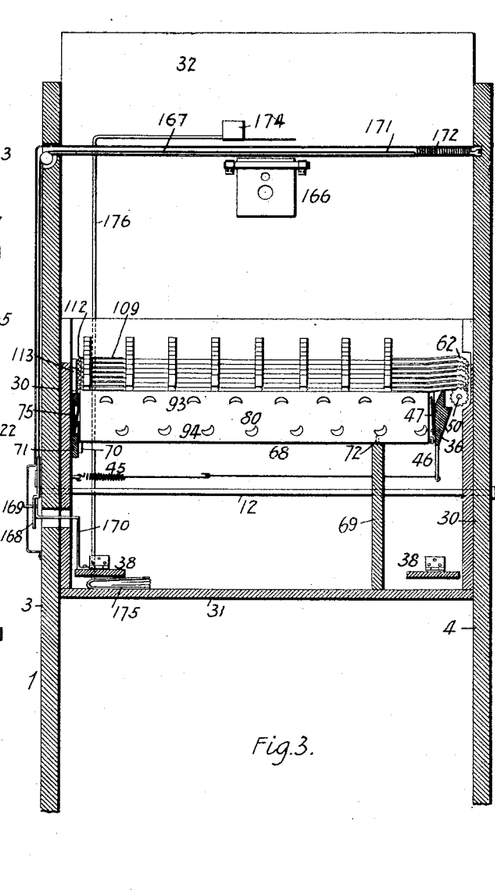
Fig. 3 is a sectional view taken in line 3 3 of Fig. 2.
Figure 4:
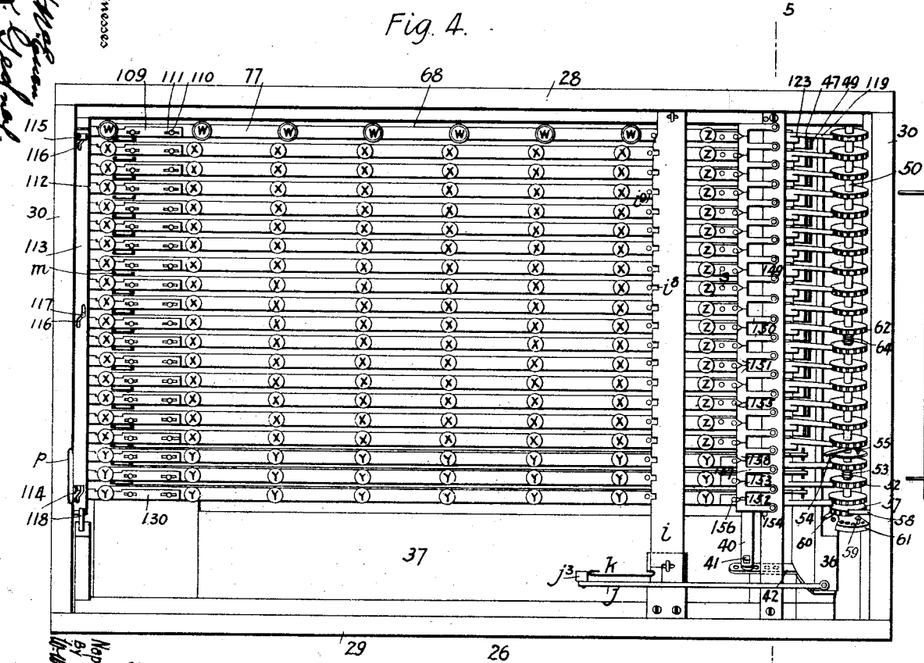
Fig. 4 is an enlarged plan view of the inner casing and contained mechanism, the casing cover and plate being removed.
Figure 5:
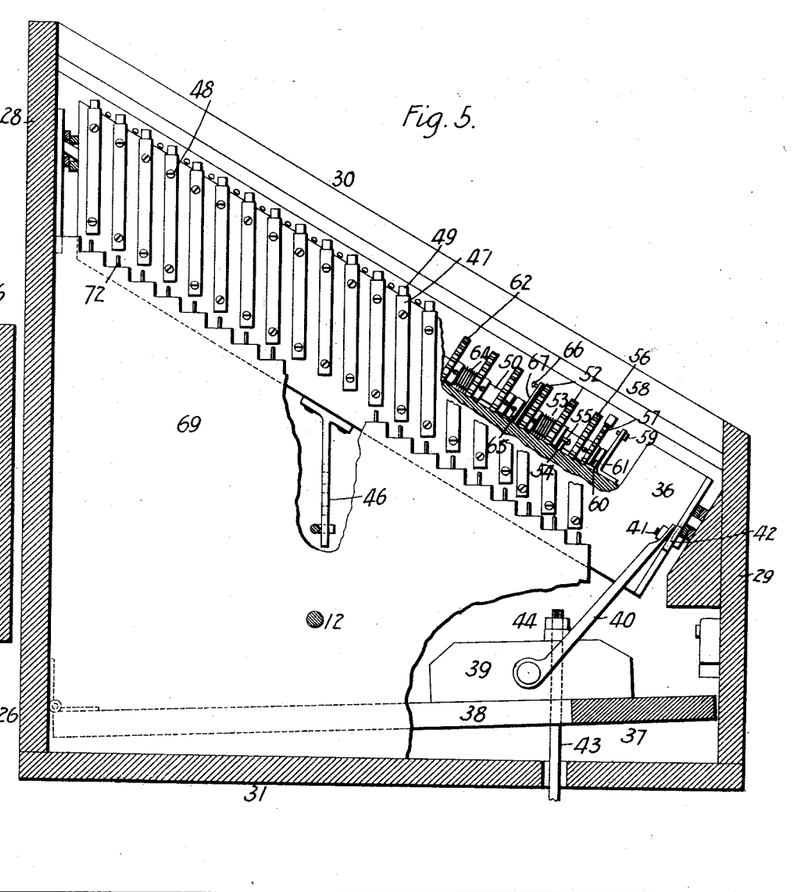
Fig. 5 is a sectional view taken in line 5 5 of Fig. 4.
Figure 6:
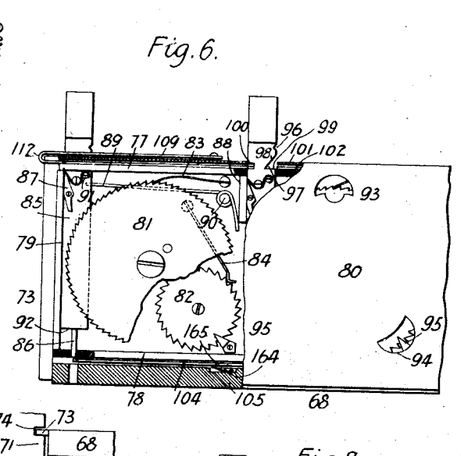
Fig. 6 is an enlarged view showing, partly in section and partly in elevation, the left-hand end of one of the register-cases.
Figure 7:
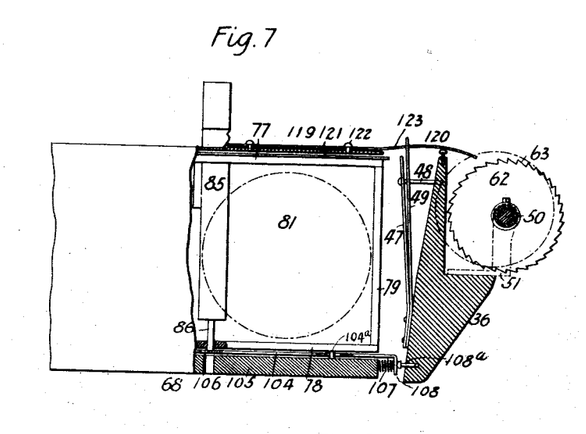
Fig. 7 is a similar view of the right-hand end of the case with its controlling mechanism.
Figure 8:
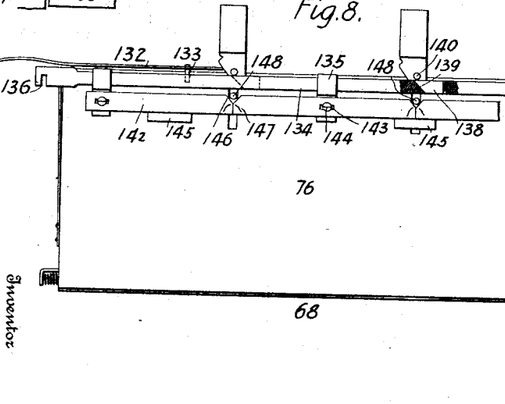
Fig. 8 is a rear elevation of the right-hand end of another one of the register-cases.
Figure 9:
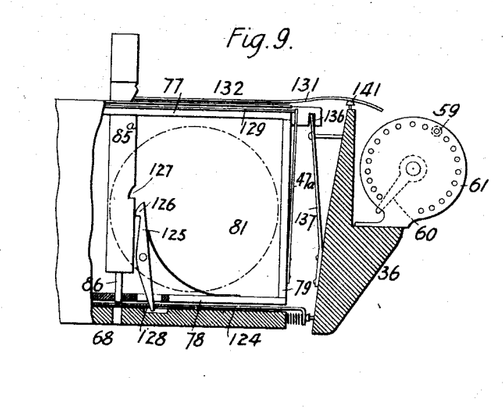
Fig. 9 is a front view, partly in section, of the same end of this case.
Figure 10:
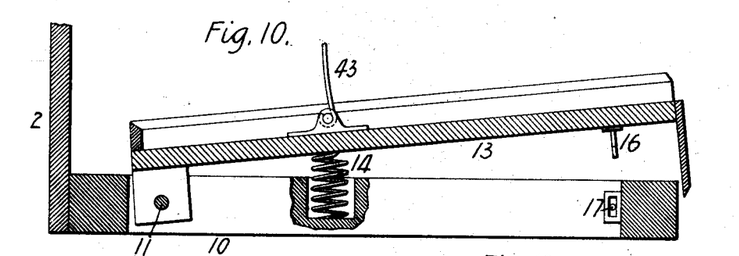
Fig. 10 is a detail sectional view of the platform in the bottom of the casing or booth.
Figure 11:
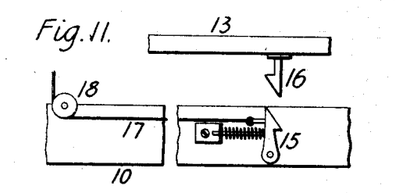
Fig. 11 is a detail view of the platform-locking device.
Figure 12:
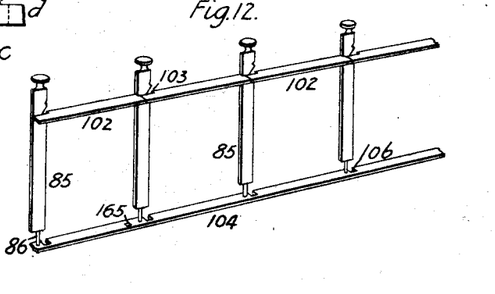
Fig. 12 is a detail view in perspective, showing a number of key-bars and upper and lower locking-bars.

Referring to the said drawings by numerals and letters, 1 denotes the outer casing, which constitutes the booth. This casing is constructed with a back 2, sides 3 4, and a front 5, the latter being hinged to the front edge of the side 4 in a manner to permit of its being swung to its closing position or to the open position shown in Figs. 1 and 2. The front or door 5 is provided with a key-controlled lock 6, by which when the door is swung open against the side 4 it may be there secured. A key-controlled lock 7 secures the door in its closed position. In addition to the back and sides, which are temporarily secured together by fastening devices 8, accessible only from the inside, the casing is provided with a top 9, similarly secured, and a bottom frame 10, and in assembling these casing portions bolts 11 12 are passed through from side to side and secured by nuts, thus making the structure rigid. Obviously by constructing the casing of readily-separable sections the structure may be knocked down into a small compass for transportation or storage and may be easily and quickly again set up for use.

In the bottom of the casing or booth is a movable platform 13, pivotally supported at its inner end on the bolt 11 and normally raised at its free outer end by the action of coiled springs 14, which are interposed between the side members of the bottom frame 10 and the under side of the platform. In practice this platform is occupied by the person voting and is depressed against the action of the springs by the weight of the occupant, and a locking device is employed to secure the platform in its lowered position after being relieved of this weight, consisting of a spring-controlled latch 15 on the bottom frame and a projection 16 on the under side of the platform, said projection being automatically engaged by the latch when the platform reaches its lowermost position. To effect the release of the platform, there is provided a cord or chain 17, which is secured at one end to the latch-bolt and is passed over a pulley 18 and attached at its other end to a rod 19, mounted to rotate in bearings 20 20 on the outer side of the casing. This rod is extended a considerable distance beyond the front of the casing and coupled to its outer end, at a right angle thereto, is a rod 21, which by being raised and lowered partially rotates the rod 19. At the other side of the casing is a rod 22, which extends outward from the casing slightly beyond the outer end of rod 19 and affords a rest for the rod 21 when the latter is in its lowered position. These rods 19, 21, and 22 afford a railing around the entrance to the booth, and admittance to and exit from the latter can be obtained only by raising the rod 21, as indicated by the dotted lines in Fig. 1, which movement causes a partial rotation of the rod 19 and the consequent winding of the cord or chain on the latter, the result being the disengagement of the spring-controlled latch from the projection and the release of the platform. The platform is, as before stated, normally raised, but is depressed when occupied and locked in this position, and is released and permitted to rise only when the person shall, after leaving the booth, raise the rod 21 to effect his exit from the railing. The rods 19 and 22 are supported by posts 23 23, and for convenience in setting up the railing the rod 19 is made in two sections joined together by a sleeve-coupling 24. A housing 25 is provided around the pulley 18, cord or chain 17, and the connection of the latter with the rod 19 to prevent tampering with these parts.

The registering mechanism is contained in a casing 26, which is supported in the booth, at the back thereof, on cleats 27. This casing 26 comprises a back piece 28, a front piece 29, which is of less height than the back, side pieces 30, and a bottom piece 31, and 32 is a cover which is hinged to the back 28 and is provided with locks 33, which secure it in its lowered position to the front 29. The cover is used in its raised position by a spring-catch 34 on the inner side of the booth or casing side 4. In the front 29 of the casing 26 is an opening, through which access may be had to the bottom of the casing.

35 is a lock-controlled door for the opening.

In the casing 26, at one side thereof, is pivotally mounted a rock-plate 36, the bearings for which are respectively secured on the inner sides of the back and front pieces 28 29. In the bottom of the casing 26 is a rock-frame 37, hinged at its inner side to the back piece 28. On one of the side members 38 of the rock-frame is a block 39, on which is pivoted one end of a rod 40, the other end of the rod being connected by a bolt 41 to an arm 42, secured to and extending laterally from the outer end of the rock-plate 36. This arm 42 is provided at intervals with holes for the bolt 41, by which the connection of the rod with said arm may be shifted to vary the throw of the rock-plate. The plate 36 is rocked through the movement of the rock-frame, which latter is connected to the platform 13 by a rod 43, the latter passing through the block 39 and is threaded for the reception of adjusting and jam nuts 44. Obviously the plate 36 may be rocked in both directions by the depression and elevation of the platform; but to relieve the plate of the shock caused by the return of the platform to its elevated position after depression the rod is caused to move the rock-frame, and consequently the rock-plate, only when the platform is depressed, the normal positions of said frame and plate being restored by the action of a coiled spring 45, which is connected at one end to one of the casing sides 30 and has rod connection at its other end with an arm 46, depending from the rock-plate. On the outer face of the rock-plate are springs 47 47, which are secured at their lower end and have their upper end free, but limited in movement by stops 48 48, which are in the nature of headed screws, and therefore adjustable to vary the limit of movement, if necessary, of the springs. 49 49 are other similar springs, which are located behind certain of the springs 47 and extend beyond the latter for a purpose presently to be explained. The rock-plate is inclined in position; but the springs 47 and 49 are vertically arranged and are each disposed opposite to the end of a register-case, with the mechanism of which they are operatively connected.

At the rear side of the rock-plate is mounted an inclined fixed shaft 50, the supports 51 for which are secured to said plate, so that in the movement of the plate the shaft is carried with it, the normal position of both being restored by the action of the spring 45. On the forward end of the shaft 50 are mounted a number of disks 52 52, three being shown, which disks are commonly rotatable against the action of a coiled spring 53. The disks may be formed integrally with a single hub, which is loose on the shaft; but I prefer to employ a separate hub for each disk and mount it fixedly by a set-screw on a loose sleeve.

54 is a stop on the rock-plate, which is engaged by a pin 55 on one of the disks when the latter are in their normal position. The periphery of each of the disks is provided with ratchet-shaped teeth 56, which are engaged to effect the movement of the disks in a manner presently to be explained. The disks are rotated a distance equal to the space between two of the teeth 56 at each manipulation, and to prevent their return to normal position until the proper time I provide a similar disk 57, the teeth of which are successively engaged by a spring-pawl 58, secured to and extending out from the casing side. In practice the disks are rotated to an extent which is predetermined by shifting a stop-screw 59 to a position to be engaged by an arm 60, movable with the disks. The stop-screw 59 occupies any one of a plurality of threaded holes provided in a disk 61, fixed to the shaft or to one of the shaft-supports. Obviously, in machines for registering a comparatively small number of votes segments may be employed in lieu of the disks 52. On the shaft 50 are also mounted other disks 62, each disk being provided with a hub which is fixedly secured by means of a set-screw on an individual sleeve loose on the shaft. The disks 62 are each provided on its periphery with ratchet-shaped teeth 63 and are commonly rotated against the action of a coiled spring 64. The normal position of the disks is determined by the engagement of an arm 65, movable with the disks, with a stop on the rock-plate, and to control the range of movement of the disks, I employ a stop-screw 66, which is inserted in any one of a number of threaded holes provided in a fixed disk 67, and which stop-screw is in the path of the arm 65 and is engaged thereby when the disks shall have been rotated to the predetermined extent.

The register-cases 68 68 occupy the upper portion of the inner casing and are supported near one end on a stepped bracket 69, which gives to the keyboard a forward inclination. The other ends of the cases are supported vertically by a cleat 70, provided at the lower inner side of an inclined block 71, fixed to one of the inner casing sides. The cases are held from longitudinal movement by the engagement of studs 72 on the bracket 69 with sockets in the under side of the cases, and the latter are supported laterally by the engagement of flanges 73 on the opposite end thereof with vertical slots 74, provided in the inner face of the block 71. Springs 75 on the block contact yieldingly with the ends of the cases and prevent endwise play of the latter. Each of the register-cases comprises a back plate 76, top plate 77, bottom plate 78, end plates 79, and a front plate 80, the latter being removable and formed, preferably, in two or more sections. The registering mechanisms. of which there are a number in each case, comprise each a figured ratchet-toothed wheel 81 and a smaller figured ratchet-tooth wheel 82, which latter wheel is adapted to be rotated a distance equal to the space between two of its teeth at each complete revolution of the wheel 81. These wheels are rotated in but one direction, and to prevent reverse rotation spring-pawls 83 84 are employed to engage the shoulders of the teeth of the wheels 81 82, respectively. Each of the registering mechanisms is separately operated by a depressible key-bar 85, the upper end of which below the button occupies a slot in the top plate 77, while its lower end 86 is reduced and passes through an opening in the bottom plate 78. The key-bar carries a spring-controlled dog 87, which when the bar is depressed is brought into engagement with a tooth on the wheel 81 and moves the latter a distance equal to the space between two of the teeth. The upper end of the dog contacts with a plate 88, and the lower end of said dog is thus positioned to engage the proper tooth on the wheel 81. The normal or raised position of the key-bar is restored by the action of a spring 89, one end of which is connected to said bar, while its other end is pressed against the plate 88, the spring intermediate of its ends being coiled around a stud 90. Stops are provided to limit the movement of the key-bar, one of which, 91, is in the form of a screw, which by contact with the under side of the top plate limits the upward movement, and the lower limit is fixed by the shoulder 92, formed by reducing the lower end of the bar, which shoulder contacts with the upper side of the bottom plate when the key-bar shall have reached its lowermost position. The front plate is provided with sight-openings 93 94, covered with transparent material, such as glass or mica, through which the number of registrations are seen. A pointer 95 indicates the number to be read on the smaller or hundreds wheel, and the spring-pawl 83 is employed to denote the number of registrations on the units-wheel.

Below the button the key-bar is provided with a notch 96, of V form, and with a depression 97, having an inclined side 98 and a straight side 99. In the opposite side of the key-bar is a straight-sided depression 100, which is in line with the side 99 of the depression 97. The front plate is provided at its upper end with a flange 101, which extends over the top plate 77, but is separated therefrom sufficiently to admit of the interposition of a locking-bar 102, which is made up of abutting sections, the sections being cut away at one end to admit the key-bars. A shoulder 103 is thus formed in each of the locking-bar sections, which shoulder in the downward movement of any one key-bar is engaged by the inclined side 98 of the depression, with the result of moving the bar 102 to lock the remainder of the key-bars in raised position. Supposing the key-bar at the extreme left to be depressed, the bar 102 is moved sufficiently far to the right to cause the ends of each bar-section to engage the depressions 100 of the remainder of the key-bars and lock the latter against movement. If an intermediate key-bar is depressed, all of the key-bars to the right are locked in this manner; but those to the left are locked by the engagement of the inclined sides 98 of their depressions with the shoulders 103 of their respective locking-bar sections, which latter are rendered immovable by the abutment of the section immediately to the left of the depressed key-bar against the side of the latter. The depressed key-bar is locked against return movement by the engagement of its notch 96 with the shoulder 103 of the adjacent locking-bar section, the locking position of said section being maintained by the action of the spring 47, which, as will presently be more fully explained, is brought by the movement of the rock-plate into engagement with the end of the locking-bar. Each and all of the key-bars are normally locked in their elevated position by the action of a locking-bar 104, which is slidably interposed between the bottom plate 78 and a bar 105, secured between the front and back plates below the plate 78. In the bar 104 are openings or slots 106, which are brought into and out of register with the openings in the bottom plate 78. Normally these openings or slots 106 are out of register, and the key-bars are consequently held against movement, the lower end 86 contacting with the bar 104. This normal locking of the key-bars is effected by a slight movement to the left of the bar 104 against the action of a coiled spring 107, which is interposed between the end of the bar 105 and the downwardly-bent end 108 of the locking-bar 104. Movement of the bar 104 to effect the initial and also the permanent locking of the key-bars is accomplished by the engagement of an adjustable stop-screw 108$^a$, projecting from the lower side of the rock-plate, with the end 108 of the bar 104, as will presently be more fully explained. A stop-pin 104$^a$, in connection with a shoulder on the bar 104, insures registering of the openings 106 with the bar ends 86.

I have shown in the drawings in connection with the machine twenty register-cases, each of which contains eight registering mechanisms, the number of key-buttons therefor being one hundred and sixty. Obviously a greater or less number may be provided. Of this number seventeen of the buttons to the right, or those marked $z$, are designed for voting what are termed "independent" or "irregular" tickets, while the lowermost three rows of buttons, or those marked $y$, are for voting for State senators and representatives, electoral, and other multiple nominees. The remainder of the buttons, with the exception of the uppermost row, are for voting regularly-nominated candidates, such as State and county officials and United States representatives. These buttons are lettered $x$, while the uppermost row, which are for voting straight tickets, are lettered $w$. In some States in the election of school officials and in some instances municipal tickets the right to vote is given to women, and by my machine such votes may be cast without danger of the voter exceeding her right, provision being made for locking the key-bars for all candidates other than those for which she is entitled to make her choice. The tickets referred to are voted by the buttons marked $z$, and to lock the remainder, or those lettered $w$, $x$, and $y$, I provide the following means: At the left-hand side of each case is a plate 109, which is slidably secured on the upper side of the flange 101 of the front plate, screws 110, which are passed through slots 111 in the plate 109, serving to guide and limit the movement of the latter. This plate 109 is bent at its end 112 to pass under the flange 101 and engage the end of the locking-bar 102. The bent ends 112 of these plates 109 contact with a lock-bar 113, which is slidably supported on the block 71, between guides 114 115. This lock-bar has at intervals inclined slots 116 116, through which are passed fixed pins 117, whereby longitudinal and lateral movement of the lock-bar is obtained. One end of the lock-bar is upturned and is engaged by a key-operated bolt 118, which is controlled outside of the machine. In practice previous to the entry of a woman into the booth the officer of the election by inserting and turning a key moves the lock-bar, which by the employment of the inclined slots and pins is thrown outwardly and carries the locking-bars 102 into position to engage the depressions 100 in the key-bars. The key-bars in the row to the right are not engaged and locked by the locking-bars 102, the locking-bar section adjacent thereto being cut away opposite to the depression, and thus said key-bars may be depressed to register votes for the tickets referred to. I have in the machine shown provided seventeen buttons for voting independent or irregular tickets; but obviously this number may be increased or diminished, and I may, if it is found necessary, add other rows for this class of candidates. In the event that there be a less number of candidates to be voted than the number of buttons provides for the machine may be so adjusted as to allow of the proper number of buttons only to be depressed, the remainder being locked when the number shall have been voted. The means for obtaining this adjustment consists of the ratchet-toothed disks 62, which, as previously described, are limited in their range of movement by the engagement of the arm 65 with the shiftable stop-screw 66, and of finger-plates 119, which are moved by the depression of the buttons $z$ to engage the teeth of the disks and cause a partial rotation of the latter. Each of the said finger-plates comprises a finger 120, which is brought into engagement with a tooth on a disk 62 when the latter is carried inward by the movement of the rock-plate, and a plate 121, which is slotted and guided by screws 122, the latter also serving as stops to limit the movement of the plate. The inner end of the plate contacts with the inclined side 98 of the depression 97 in each of the key-bars having the button $z$, and when said key-bar is depressed the inclination moves the plate and finger forwardly and causes, by the engagement of the finger with a tooth on the disk 62, a partial rotation of this disk equal to the distance between two of its teeth. All of the disks 62 move commonly the distance stated at each depression of a key-bar, and the manipulations may be carried on until the arm 65 engages the stop 66, when all of the remainder of the key-bars are locked. The finger-plates have shoulders 123, which are beyond the end of the case and are engaged by the springs 49 on the rock-plate, which springs operate to return the finger-plates to their normal retracted position. The springs 49 also operate to hold the remainder of the finger-plates from outward movement during the depression of one of the buttons $z$.

Figure 13:
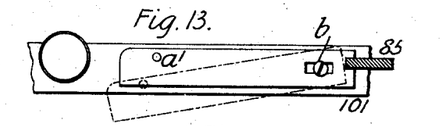
Figs. 13 and 14 are detail views showing one of a number of auxiliary bars in connection with the upper locking-bar for locking certain of the key-bars.
Figures 14, 16:
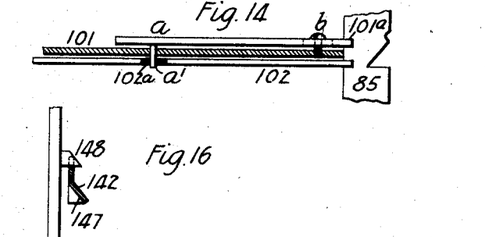
Fig. 16 is a detail view of one of the slide-bars for preventing the depression of more than one of the key-bars *y* at one time.

In instances where municipal and school-official tickets and the like are being voted and the right of women to vote is restricted, for example, to the latter it is necessary that means be provided for locking the key-bars for the municipal tickets in order to prevent the voter from exceeding her right. Such provision is made in my machine, the means, which is shown most clearly in Figs. 13 and 14, consisting of an auxiliary locking-bar $a$, which is mounted on the flange 101, its inner end being slotted for pivotal and sliding connection with a screw $b$ on said flange. From the other end of the bar $a$ there projects downwardly a pin $a'$, which when the bar is moved to the position shown in full lines in Fig. 13 projects through an opening in the flange 101 and engages a hole $102^a$ in the locking-bar 102. With the pin of the bar $a$ engaging the bar 102 the latter in its movement through the lock-bar 113 carries the bar $a$ into engagement with a depression $100^a$ in the key-bar, with the result of locking the latter against movement. By raising the free end of the bar $a$ to disengage the pin from the bar 102 the key-bar will not be locked by the movement of the lock-bar 113 and can be depressed. The bar $a$ when idle is turned to one side and its pin engages another opening in the flange 101, the bar 102 being cut away at this point to permit its free movement.

Figure 15:
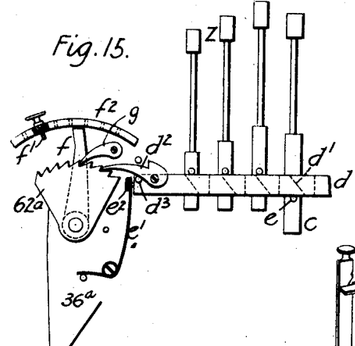
Fig. 15 is a detail view of a modified form of the mechanism for controlling the key-bars $z$.

In Fig. 15 is shown a modification of the mechanism for controlling the number of key-bars $z$ to be manipulated. In this construction a single ratchet-tooth disk or segment $62^a$ is employed, said disk or segment being rotatably mounted on a rock-plate $36^a$, located at the front of the register-cases. Each of the key-bars $z$ is extended at its lower end below the bottom plate 78 and bar 105, said extension, which is lettered $c$, being adjacent to a locking-bar $d$, slidably mounted below the register-cases. In this bar $d$ are recesses $d'$ $d'$, one of the walls of each of which is inclined and is engaged by a pin $e$ on the key-bar as the latter is depressed. The bar $d$ carries at its forward end a pivoted dog $d^2$, limited in its downward movement by a stop $d^3$, said dog engaging at each forward movement of the bar $d$ a tooth of the disk or segment to cause the latter to rotate a distance equal to the space between two of its teeth. The bar $d$ is moved forwardly by the engagement of the pin $e$ of a key-bar with the inclined wall of the recess at each depression of the key-bar, said movement being made against the action of a spring $e'$, one end of which is fixed to the rock-plate 36ª, while its other end is secured to the bar $d$. The partial rotation of the disk or segment by the movement of the bar $d$ is effected when the plate 36ª has been rocked to the position shown, and such position of the plate operates to put the spring $e'$ under the requisite tension to retract the bar $d$, and thereby lock the depressed key bar or bars by bringing the pin or pins thereon to one side of the recess. When the rock-plate is restored to its normal position, the spring $e'$, aided by a limiting-screw $e^2$ on the plate, moves the bar $d$ forwardly and brings the recesses in line with the pins, thus permitting the depressed key-bars to rise. The rotation of the disk or segment is governed by an arm $f$ on the shaft of the disk or segment engaging a screw $f'$, which may occupy one of a number of threaded holes provided in a curved plate $f^2$.

$g$ is a pawl which engaging a tooth of the disk or segment prevents backward movement thereof. The rock-plate is moved through connection with the platform in a manner similar to that described with reference to the rock-plate 36.

The registering mechanisms which are operated by the buttons $y$ are controlled by the following means: Each of the key-bars 85ª is normally locked in its raised position by a lower locking-bar 124, which is similar in construction and operation to the bars 104; but to hold a key-bar when depressed I employ a spring-controlled catch 125, which is in the form of a lever pivoted centrally and having at its upper end a hook 126, adapted to engage a notch 127, provided in the side of the key-bar. The lower end of the catch occupies a slot 128 in the locking-bar 124, and as the latter is moved to the left to assume its normal position the catch is swung sufficiently to cause its hook end to disengage from the notch, and thereby release the key-bar. The upper locking-bar 129 when moved by the plate 130 and the key-controlled bar 113 operates to lock all of the key-bars $y$ against depression, the movement of the bar 129 being made against the action of a spring 47ª, which is carried by the case.

I have shown in the drawings three cases provided with the buttons $y$, there being, therefore, twenty-four buttons, although obviously a greater or less number may be employed. To permit of votes being cast for a certain number of candidates only, I provide controlling mechanism, of which the ratchet-toothed disks 52 form a part. Each of these disks is engaged by a finger 131, which is carried by a plate 132, slidably secured by guiding and limiting screws on the flange of the front plate of the case, and said plate 132 is connected by a pin 133 with a slide-bar 134, movable in guides 135 at the upper rear side of the back plate or in suitable guides within the case, as preferred. The slide-bar 134 has at its end a recess 136, which is engaged by the upper end of a spring 137, secured on the outer side of the rock-plate. The function of this spring is to restore the normal retracted position of the slide-bar. Each of the slide-bars is provided with recesses 138, corresponding in number to the number of key-bars in a case, the recesses being made in the inner side of the slide-bars and formed each with an inclined wall 139. A pin 140 on each key-bar engages, when the latter is depressed, the inclined wall of a recess and forces the slide outwardly against the action of the spring 137, and consequently moves the plate 132 and finger 131, and by the engagement of the finger with its respective disk 52 the latter is partially rotated and held against retraction by the spring-pawl 58, as hereinbefore stated. When the votes for the predetermined number of candidates have been cast, the remaining buttons are locked by the engagement of the arm 60 with the stop-screw 59, which engagement holds the disks against movement, and the disk-teeth thus form stops against the depression of the elevated key-bars. Obviously the stop-screw 59 may be positioned to permit of any desired number of votes being cast. The fingers 120 and 131 ride in their movements over screws 141, which screws may be adjusted to properly position the finger ends to engage the teeth of the disks.

The key-bars carrying the buttons $y$ may be successively manipulated regardless of their relative location, and in this respect they differ from the key-bars $x$, as only one in a row of each of the latter bars may be depressed, the remaining key-bars in the row being locked in their elevated position. To prevent the possibility of more than one of the key-bars $y$ in a row being depressed at one time, I provide the following means: At the rear side of each of the register-cases is slidably mounted a bar made up of separate sections 142 142, each section having midway of its length a slot 143, through which is passed a screw 144, the latter being inserted into a guide 135, whereby the central portion of the section extends outwardly beyond the back plate 76. The ends of the section are bent inwardly and yieldingly contact with said back plate, the section being of spring metal. 145 is a guide-block for each section. The upper outer ends of each section are beveled, as at 146 146, by cutting away the upper corners. The lower outer ends of each section are bent outwardly to provide transversely-beveled inner surfaces 147 147. Each of the key-bars $y$ is provided below the pin 140 with a pin 148, the outer side of which is beveled (see Fig. 16) to correspond with the surface 147. In practice one of the key-bars $y$ being depressed its pin 148 by engaging the beveled edges 146 of the adjacent ends of two sections 142 forces the latter apart sufficiently to enable the key-bar to be moved downwardly to operate the registering mechanism. The slots 143 in the sections are of such a length only as allow of a movement of the bar sufficient to permit the passage of a pin 148 between any two of its sections, and it will therefore be seen that any attempt to depress more than one key-bar at a time is prevented, as instead of a passage for the pins 148 of said bars being provided the sections act as a positive stop by presenting immovable shoulders to the pins. After one of the key-bars has been depressed, however, any other one of the bars may be likewise manipulated, as the pin of the depressed key-bar occupies the recess formed by the beveled surfaces 147 of the adjacent sections and in no way interferes with the movement of the sections. When a depressed key-bar is released, the beveled end of the pin engages the beveled surface 147 and forces the end of the section outwardly until the section is passed, when the latter is restored to normal position by its spring action. If desired, the bar formed of the sections 142 may be connected with the lock-bar 113, whereby locking of the elevated key-bars may be effected through the bar-sections and pins 148.

Figure 17:
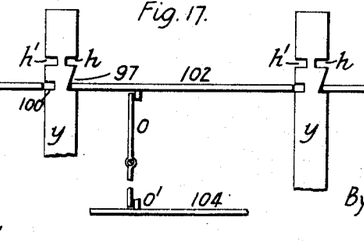
Figs. 17 and 18 are detail views of a modification of the means for preventing the depression of more than one of the key-bars *y* at a time.
Figure 18:
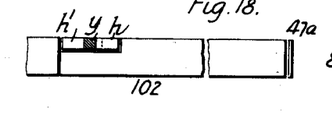
Figures 19, 20, 21, 22, 23, 24, 25, 26:
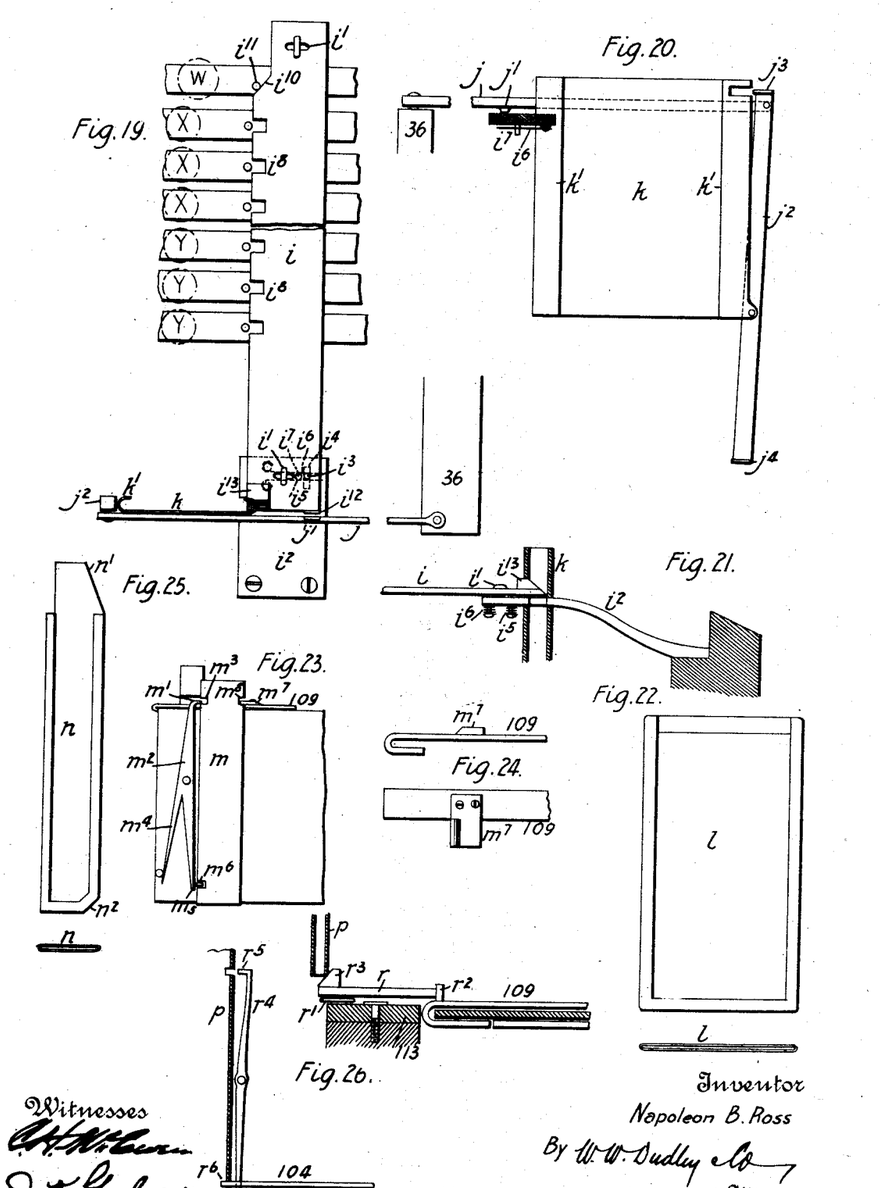
Fig. 19 is a detail plan view of the lock-plate for locking all of the key-bars *x*, *y*, and *z* upon the depression of a key-bar *w*, also of the chute for voting-tickets for personal nominations.
Figs. 20 and 21 are further views of the personal-nomination chute.
Fig. 22 is a perspective view of a personal-nomination-ticket case.
Fig. 23 is a detail view of the chute employed for voting any one or more personal nominees.
Fig. 24 is a detail view of the upper locking-plate employed in connection with the chute for voting any one or more personal nominees.
Fig. 25 is a perspective view of the case for tickets for voting any one or more personal nominees.
Fig. 26, sectional views of the chute for voting multicandidate tickets.
Figure 27:
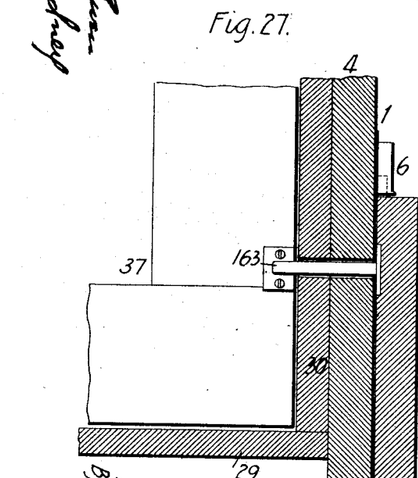
Fig. 27 is a detail view of a portion of the rock-frame and the stop-pin for limiting its upward movement.

In Fig. 17 is shown means for preventing the simultaneous depression of two or more of the key-bars $y$ of a case, which means may be employed in lieu of the sections 142 and correlative parts. Said means consists of the sectional locking-bar 102, which, as hereinbefore stated, is moved against the action of the spring $47^a$ by depressing a key-bar. The key-bar is provided above its depressions 97 and 100 with notches $h$ and $h'$ in the same plane, the former being located similarly to the notches 96 of the key-bars $x$, but having a depth relatively greater, while the latter is at the opposite side of the key-bar. In practice the bar 102 is moved by the action of the spring $47^a$ to bring the ends of the sections in contact with the inclined side of the depressions 97. Supposing one of the intermediate key-bars to be depressed, the sections of the bar 102 to the right are moved outwardly to engage the depressions 100 of the respective key-bars and lock them in their elevated position, while the key-bars to the left are locked in their elevated position by the locking-bar sections engaging the inclined sides of their depressions 97, which sections are rendered immovable as soon as the depression 100 of the key-bar being depressed is brought out of line thereof. By this construction, therefore, the depression of two or more key-bars at a time is prevented; but when one key-bar has been depressed its notches $h$ and $h'$ are brought in the same plane with the locking-bar sections, and the depth of said notches is such that sufficient movement of the sections is afforded to permit the depression of a second key-bar, after which a third key-bar may be manipulated, and so on until, if desired, all of the key-bars have been depressed. The depressed key-bars are locked by the catches 125 and also by the engagement of the sectional locking-bar with the notches. The catches 125 are moved to release the key-bars by the movement of the lower locking-bar, and to cause the sectional locking-bar to become disengaged from the key-bar notches to allow the key-bars to rise I provide a rock-arm $o$, which is pivoted centrally to the register-case and engaged at its lower end by a pin $o'$, carried by the lower locking-bar, its upper end engaging a pin on the upper locking-bar. These parts are so adjusted as to insure through the movement of the lower locking-bar and rock-arm the proper positioning of the upper bar-sections to bring the section ends out of engagement with the notches of the key-bars to permit elevation of the latter. The upper locking-bar is capable of being moved independently of the rock-arm to effect the locking of the elevated key-bars through the lock-bar 113, such movement being slightly in excess of that afforded by the rocking of the arm $o$. It is preferable that the movement of the upper locking-bar sections to disengage the key-bars be effected slightly in advance of the release of the latter by the catches, and thereby permit of free movement of the said sections.

To prevent more than one of the key-bars $z$ being depressed at one time, I provide the following means: A bar 149 is fixedly secured transversely across the cases having the said key-bars, and on said bar are pivoted sections 150, having at their outer ends abutting cross-pieces 151. The ends of the cross-pieces are provided with bevels 152 and 153, located and formed similarly to the bevels 146 and 147 of the sections 142, and stops 154 are provided on the bar 149 to limit the transverse movement of the sections 150, whereby the cross-pieces are separable to an extent sufficiently only to allow of the passage of a single pin 155, carried by each of the finger-plates 119. Obviously any attempt to depress two or more of the key-bars $z$ will cause the pins 155 on the respective finger-plates to shoulder against the cross-pieces, whereas if only one key-bar is manipulated the cross-pieces will separate sufficiently to enable the complete movement of said bar and finger-plate. Similar means is employed to prevent the coincident manipulation of two or more key-bars $y$ in any two or more rows. The finger-plates 132 of the cases containing these key-bars are provided with pins 156, which coöperate with sections 157, provided with bevel-ended cross-pieces 158, in a manner similar to that above described, with the difference that the pins do not lodge in the recess formed by the bevel 153; but, on the contrary, the finger-plates 132, as before stated, are restored to their normal retracted position as soon as the key-bars shall have been depressed to their fullest extent.

The key-bars which are lettered $w$ and which are employed for voting straight tickets are carried by the top case and are seven in number, counting from the left. This number may be increased or diminished. The depression of a single key-bar effects in the manner hereinbefore described the locking of the remainder in their elevated position, so that only one straight ticket can be voted by one person. The manipulation of a key-bar $w$ also locks all of the key-bars $x$ and $y$, the means for effecting this result consisting of a lock-bar $i$, which is arranged transversely of the cases and is slidably mounted at its ends to permit of longitudinal movement. To allow for this movement, the bar is slotted at its ends and T-headed screws $i'$ $i'$ are passed through the slots into the back piece 28 of the inner casing and into a bracket-plate $i^2$, projecting inwardly from the front piece 29. By giving a quarter-turn to these screws the bar may be readily removed. At the forward end of the bar $i$ is a pin $i^3$, which occupies a slot $i^4$ in the plate $i^2$. $i^5$ and $i^6$ are coiled springs the ends of which project across the slot $i^4$ and engage the pin at each side to restore the normal position of the bar $i$ after movement in either direction, such position being determined by a stop-pin $i^7$, which is carried by the plate $i^2$ and against which the ends of the springs abut. The bar $i$ is provided along one side with slots $i^8$ $i^8$, which normally occupy positions opposite to pins $i^9$, carried by the upper locking-bars of the key-bars $x$ and $y$. At the upper end of the bar $i$ is an inclined shoulder $i^{10}$, which abuts against a pin $i^{11}$, carried by the upper locking-bar of the key-bars $w$. A key-bar $w$ being depressed the bar $i$ is moved by the engagement of the pin $i^{11}$ with the inclined shoulder, and such movement carries the slots $i^8$ out of line with the pins $i^9$, the result being that all of the upper locking-bars of the key-bars $x$ and $y$ are held against movement, and said key-bars are locked in elevated position. The movement of the bar $i$ is, as before stated, against the action of a spring, said spring being that lettered $i^5$, and when the depressed key-bar $w$ is released and is restored to its elevated position this spring operates to return the bar $i$ to the normal position or that position which brings the slots $i^8$ opposite to the pins $i^9$ and permits the key-bars $x$ and $y$ to be depressed. To prevent the possibility of manipulating the key-bars $w$ before the platform shall have been depressed to its limit of movement, I provide an arm $j$, secured at one end to the rock-plate and toward its other end guided by the bracket-plate, which arm carries a projection $j'$, arranged in the path of a stop $i^{12}$ on the bar $i$. The movement of the rock-plate to release the key-bars carries the projection $j'$ opposite to the stop $i^{12}$, but at the end of such movement the projection is to one side of the stop, and the bar $i$ is consequently free to be operated.

Supported, preferably, adjacent to the bracket-plate is a chute $k$, consisting of a plate having inturned sides $k$ $k'$, which afford guides for a case containing a ticket, the purpose of which will be presently explained. The case $l$, which is preferably a plate, the sides and one end of which are bent over to provide a ticket-recess, is insertible, and may pass through the chute only under certain conditions, as follows: The arm $j$ is connected at its outer end to the upper end of a rock-arm $j^2$, pivoted to the chute, whereby movement of the rock-plate is communicated to the rock-arm. The rock-arm is provided with an upper step $j^3$, which when the platform is elevated enters a recess provided in one of the guides $k'$ of the chute and prevents the insertion of a ticket-case, but when the platform is depressed movement of the rock-plate causes the upper end of the rock-arm to be moved to carry the step $j^3$ out of the recess and leave the chute free for the insertion of the case. The lower end of the rock-arm is by this movement carried inwardly, and a step $j^4$ on its lower end affords a support for the inserted ticket-case and prevents the latter from passing through the chute, as will be understood. When, however, the platform is released, the rock-arm is moved to its normal position, which allows of the now unsupported ticket-case to fall into a suitable receptacle and again brings the upper step into position within the recess to prevent the insertion of another ticket-case until the platform is again depressed by another voter. To prevent the manipulation of the key-bars while the chute is occupied by a ticket-case, there is provided on the bar $i$ an inclined shoulder $i^{13}$, which as a ticket-case is being inserted is engaged by the side of the latter, thereby causing the bar $i$ to be moved against the action of the spring $i^6$ to bring the slots of the bar out of line with the pins of the locking-bar to lock the key-bars $x$ and $y$ and to prevent the movement of the bar $i$ by the pin of the locking-bar of the key-bars $w$.

The tickets designed for use in connection with the chute $k$ are intended for what are termed "personal nominations." This class of tickets previous to insertion are supplied by the voter with the names of the candidates of his own choice, it being understood, as before stated, that by such choice the voter is denied the right of casting his ballot for any of the regular nominees. The insertion of this ticket operates, as before stated, to lock all of the key-bars denoted $w$, $x$, and $y$; nor are said key-bars released until the voter shall have left the booth.

I have in my machine provided means by which a voter may cast his ballot for any one or more personal nominees in preference to certain nominees on the regular tickets and, if desired, to vote the balance of his ballot for the remaining regular nominees. For this class of candidates tickets similar to those above described are employed in connection with a case which is preferably of less width than the cases $l$, inasmuch as the ticket it holds will contain but one name. The chute $m$ for the cases may occupy a position with reference to a register-case similarly to that of a key-bar. In the drawings the chute is shown as secured to the exterior of the register-case, and such a location will answer for the purpose of illustration. The chute is normally closed against the insertion of a ticket by a step $m'$ at the upper end of a rock-arm $m^2$, pivoted at one side of the chute. This step enters a recess $m^3$ in one side of the chute, this position being effected by the movement of the lever against the action of a spring $m^4$ through its engagement with a step $m^5$, carried by the lower locking-bar 104. This locking-bar is, as before stated, normally moved inwardly by the rock-plate, and the step $m^5$ is carried thereby into engagement with the lower end of the rock-arm. While the platform is occupied, the bar 104 is moved by its spring outwardly, thereby carrying the step $m^5$ away from the rock-arm, which through its spring is rocked to cause the upper step $m'$ to move from the recess to free the chute and allow of the introduction of a ticket. The outward movement of the bar 104 carries the step $m^5$ into a recess $m^6$, provided near the lower end of the chute. With the parts in the position described, a ticket-case being inserted rests on the lower step $m^5$. The platform being then released, the bar 104 is moved inwardly by the rock-plate and the lower step is carried out of the recess $m^6$ and the ticket falls by gravity into a suitable receptacle, it being understood that a separate receptacle is provided for each chute. This movement of the lower step rocks the arm and carries the upper step into the upper recess, the ticket-case, which is lettered $n$, being cut away, as at $n'$, to prevent interference with the upper step. The use of the ticket just referred to precludes the casting of a ballot for the regular candidate for the same office, and to lock out the key-bars for voting the latter I provide on the plate 109 a projection $m^7$, which normally occupies a recess $m^8$ in the opposite side of the chute and is beveled at its inner edge. The lower corner $n^2$ of the ticket-case is beveled or inclined, and as the case is inserted the inclined surfaces of the latter and projection $m^7$ engage, with the result of moving the plate 109, and consequently the upper locking-bar, to lock the elevated key-bars.

To enable a voter to cast his or her ballot for personal nominees in preference to the regular nominees on the independent or irregular tickets, I employ a ticket and ticket-case, which are used in connection with a chute and its accessories, which is similar in all essential details to the chute $m$. In voting a ticket of this character locking of the key-bars $z$ is effected by causing the engagement of a rod with the sections 150, whereby said sections are held against movement. Obviously other chutes may be provided for use in connection with such other tickets as may be contemplated by the laws of the different States.

For voting for personal nominations of multiple candidates and fractional or accumulative votes I provide a ticket, the case for which is similar in construction to the case $l$. This case is insertible in a chute $p$ provided at one side of the key-bars. It must be understood that by employing this character of ticket the voter is denied the right of voting for the regularly-nominated multiple candidates by means of the key-bars, and that therefore said key-bars are locked against manipulation. To lock the said key-bars upon the insertion of the ticket, there is provided a lock-plate $r$, which is of sufficient length to extend transversely across the entire number of cases containing the key-bars $y$ and which is mounted above the lock-bar 113 to have lateral outward movement against the action of a spring or springs $r'$. This plate $r$ at its outer side abuts against a pin $r^2$, carried by the plate 109 of each register case, and at its inner side is an inclination $r^3$, which is engaged by the ticket-case to move the plate $r$, and consequently the plates 109, into position to lock the elevated key-bars.

To prevent the insertion of a ticket-case previous to the occupation of the platform, there is provided a rock-arm $r^4$, which is pivoted to one of the register-cases and has at its upper end a step $r^5$, normally occupying a recess in the upper end of the chute $p$ and closing the latter. This arm $r^4$ is rocked through connection with the lower rocking bar, which is slotted to receive the lower end of the arm, and said bar is extended to provide a lower step $r^6$, affording a support for the inserted ticket-case during occupation of the platform. Obviously when the platform is released the lower locking-bar is moved by its spring outwardly, carrying the lower step out of engagement with the ticket-case, which then drops into its receptable, and this movement of the bar also carries the upper step into closing position.

A case-plate 158, which may be in one piece or in sections, as preferred, is employed to cover the inner casing during the period of voting, openings 159 being provided for the buttons, and there is also a lock 160, by which said case plate may be fastened to place. The names of the candidates are preferably affixed to the plate opposite the buttons, and panels 161, of glass, are employed to cover the slips on which the names appear to prevent tampering with or mutilating the slips. The panels removably occupy recesses provided in strips 162 at the front and rear upper side of the case-plate.

The door of the booth is provided at its outer side with a stop-pin 163, which when said door is swung against the side of the booth projects through an opening in said side into the path of the rock-frame and affords a stop for the latter. The rock-plate, which, as before stated, is restored to its normal raised position by the spring 45, is limited in its upward movement by the action of the stop-pin, and said rock-plate therefore effects a sufficient movement only of the lower bars 104 to initially lock the key-bars against depression. When, however, the door is swung to bring the pin out of the path of the rock-frame, the latter and the rock-plate are released and move to their limit, and said rock-plate is rocked sufficiently to cause the locking-bars 104 to be moved farther inwardly and to be engaged by a spring-catch 164, provided in the bottom of the case. In this manner all of the key-bars are what may be termed "permanently" locked, as their release is effected only by the employment of a special implement, which when a section of the front plate of a case has been removed is inserted through an opening in the bottom plate and depresses the catch 164 sufficiently to free it from the shoulder 165, formed by slotting the locking-bar.

Figure 28:
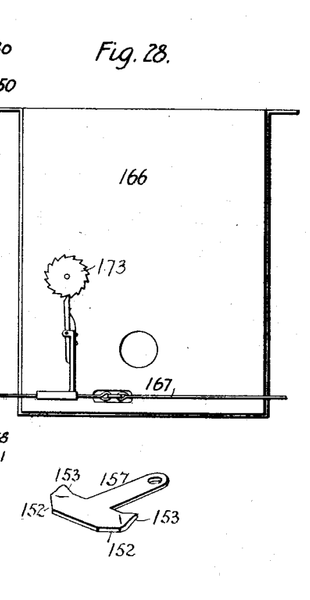
Fig. 28 is an enlarged plan view of the camera attachment.

For the purpose of securing as a record the likeness of a voter I provide a camera 166, which is secured on the front side of the cover of the inner casing when said cover is raised, and which is operated either through connection with the platform or through means controlled by a person outside of the booth. A cord or chain 167 is connected at one end with the shutter-arm of the camera and terminates in a plate 168, having a hole for the introduction of a removable pin 169, which is also inserted in a hole provided in an arm 170, carried by the rock-frame 37. When the platform is depressed by the weight of the occupant, the arm 170 and plate 168 being connected, the shutter is moved and the exposure made. By removing the pin 169 the camera is disconnected, and may, if desired, be operated by pulling on the cord or chain from the outside of the booth. To restore the normal position of the parts, a cord or chain 171 is connected to the shutter-arm at its opposite side and to a spring 172, secured to the casing. The film-roll is operated through a spring-controlled dog carried by an arm on the cord or chain 167, which dog engages at each movement of the cord or chain a tooth on a ratchet-toothed disk 173 on the roll-spindle. A flash-light device 174 may be operated at each downward movement of the platform, the bellows 175 being compressed between the rock-frame and bottom of the inner casing. The air from the bellows is conducted through a tube 176 to the flash-light device 174.

In the operation of the machine the front door is unlocked and secured against the casing side, which brings the stop-pin 163 into the path of the rock-frame and limits the movement of the rock-plate to effect the closing of the chutes and the initial locking only of the elevated key-bars. The cover of the inner casing is then unlocked, and the railing being set up the machine is ready for operation. A curtain is preferably provided to cover the booth-entrance to prevent observation from without. It is presumed that the case-plate has been provided with slips containing the names of the candidates and that the names and emblems of the party-tickets have been affixed to the cover in proper relation to the keyboard. A person desiring to vote enters the railing around the booth by raising the rod 21 and steps upon the platform, which is depressed and locked by the latch 15. The downward movement of the platform causes the lower side of the rock-plate to become disengaged from the lower locking-bars, and these bars being released are moved by their springs to bring the openings therein into line with the key-bar ends, and thus permit the key-bars to be depressed. The voter while occupying the platform is at liberty to cast his or her vote, and presuming that this has been done the voter makes his or her exit from the booth, leaving the platform locked in its lowered position. The railing extends some distance beyond the entrance to the booth, so that the voter is in full view when in order to get without the railing he or she raises the rod 21. The raising of this rod releases the platform through its cord or chain connection with the latch, and the platform rising the parts are restored to their former position and are locked against manipulation.

In voting for regular candidates, such as State and county officials and United States Representatives, a person can cast a ballot for each office, but is not permitted to vote for two candidates for the same office, nor can he repeat his vote for any one candidate. Supposing the different tickets to be represented in the different columns running from front to rear, it will be impossible to depress more than one of the buttons $x$ in any one row running from side to side. In voting for State senators, representatives, or electoral and other multiple candidates the buttons $y$ may be each depressed regardless of the others; but the number is governed by the number of offices to be voted, and the machine is adjusted accordingly. The same is true of the buttons $z$, which denote independent or irregular offices, such as school offices, road-supervisors, constitutional amendments, &c., the number of buttons corresponding to the number of offices for which there are candidates to be voted. When a vote is to be cast by a person of limited rights of franchise, all of the buttons $w$, $x$, and $y$ are locked previous to his or her entrance into the booth by the officer of the election, and said person is thus permitted to depress the buttons $z$, but only such number of them as shall have previously been provided for.

The buttons $w$ are preferably arranged intermediately of the buttons $x$, as shown, and are also preferably of relatively large dimension. These buttons, which are for voting straight tickets, are preferably so designated by having the word "Straight" or equivalent word or expression on the button, so as to clearly distinguish from the other buttons. But one of the buttons $w$ can be depressed, and by its manipulation all of the buttons $x$ and $y$ are locked against movement. Previous to the election the register-cases are adjusted to show no count, and to secure against the depression of one or more key-bars before the cases are assembled in the machine I provide screws s, which are inserted in the plates 109 and case-flanges and are removed only when the cases are in place.

The employment of the ticket-chutes and the mechanisms accessory thereto enables a voter to cast his ballot for personal nominees in preference to all or to certain of the nominees on the regular tickets and in the latter event to vote the balance of his ballot for the remaining regular nominees, or to cast his ballot for personal nominations of multiple candidates and fractional or accumulative votes, or to cast his or her ballot for personal nominees in preference to the nominees on the irregular or independent tickets. In other words, my machine provides for all of the classes of votes contemplated by the various laws of the States and is therefore universal, though it will be understood that certain of the provisions made may be omitted where the necessity for their use has not arisen.

It is my purpose that the keys which are used to lock and unlock the different parts of the booth and inner casing shall be in the possession of a number of legally-authorized persons in order that no one person will be able to gain complete access to the machine, but that such access may be had only by the coöperation of them all. After the vote is complete the door of the booth is swung to release the lock-plate, and as a result the registering-cases are what may be termed "permanently" locked and may be taken from the machine without danger of being manipulated to change the true result. Upon being taken from the machine a glance at the indicated numbers on the disks will give the correct result of the registrations for each of the candidates.

It will be observed that by the use of my machine there is obtained absolute secrecy of the ballot and that the utmost precaution is taken to prevent the possibility of the result of the voting being known until after the voting is completed and the polls are closed. This feature of my invention is of great value, as by the use of the various safeguards it is impossible to ascertain the choice made by the voter or to gain any information relative to the votes cast for the different candidates until the poll is complete.

I claim as my invention—

1. In a voting-machine, the combination with a platform adapted to be depressed against the action of a spring to unlock the register mechanism, of means for automatically locking the platform in depressed position, and a railing extending at a distance around the open front of the machine having a movable portion operatively connected with the locking means and adapted when manipulated by the voter to release the platform and permit its elevation.

2. In a voting-machine, the combination of a booth, a platform in the booth operatively connected with the register mechanism to lock and release the same, a spring-latch adapted to automatically lock the platform in depressed position, a railing extending at a distance around the open front of the booth having a movable portion affording a gate, and a connection between the gate and latch whereby manipulation of the gate releases the platform and permits its elevation.

3. In a voting-machine, the combination of a booth, a platform in the booth operatively connected with the register mechanism to lock and release the same, a spring-latch adapted to automatically lock the platform in depressed position, and a railing extending at a distance about the booth-opening having one of its side portions rotatably mounted and connected by a cord or chain with the latch, and having a front portion affording a gate fixed to the rotatable portion, whereby manipulation of the gate releases the platform and permits its elevation.

4. In a voting-machine, the combination with register mechanism, a rock-plate operatively connected with the register mechanism to lock and release the same, an arm carried by the rock-plate connected with a spring to retract the plate, a rock-frame below the rock-plate, a rod pivotally attached to the frame and adjustably connected with the plate, a platform below the rock-frame, a spring to elevate the platform, and a rod attached to the platform and provided with a shoulder engaging the frame in one direction of the movement of the platform.

5. In a voting-machine, the combination with register mechanism, of key-bars adapted when depressed to actuate the register mechanism, a spring-controlled slide-bar normally in the path of the key-bars, a platform, means controlled by the movement of said platform operating to move the slide-bar and permit depression of the key-bars, and devices for locking the key-bars in depressed position said devices being retracted by the movement of the slide-bar.

6. In a voting-machine, the combination with register mechanism, of key-bars adapted when depressed to actuate the register mechanism, spring-controlled catches adapted to engage and lock the key-bars in depressed position, a spring-controlled slide-bar normally in the path of the key-bars and connected with the catches, a platform, and means controlled by the movement of said platform for moving the slide-bar to permit depression of the key-bars and to retract the catches to release the key-bars when depressed.

7. In a voting-machine, the combination with register mechanism, of key-bars adapted when depressed to actuate the register mechanism, spring-controlled catches adapted to engage and lock the key-bars in depressed position, a spring-controlled slide-bar connected with the catches, a platform, and a rock-plate controlled by the movement of said platform and operating to move the slide-bar to disengage the catches and permit the key-bars to rise.

8. In a voting-machine, the combination with register mechanism, of key-bars adapted when depressed to actuate the register mechanism, a platform, a rock-plate controlled by the movement of said platform, and mechanism for limiting the number of key-bars to be depressed said mechanism being carried by the rock-plate and brought by the movement thereof into position to be actuated by the key-bars.

9. In a voting-machine, the combination with register mechanism, of key-bars adapted when depressed to actuate the register mechanism, slide-fingers adapted to be moved by the depression of the key-bars, a platform, a rock-plate controlled by the movement of said platform, a shaft on the rock-plate, toothed wheels or segments on the shaft adapted in the movement of the rock-plate to be brought into the path of the fingers, and means for limiting the rotation of the wheels or segments.

10. In a voting-machine, the combination with a register mechanism, of a key-bar adapted when depressed to actuate the register mechanism, said key-bar having an inclined shoulder, a slide-plate arranged to be engaged and moved by the shoulder of the key-bar said plate carrying a finger, a rock-plate carrying a spring, a shaft on the rock-plate, a spring-controlled toothed wheel on the shaft, an arm removable with the wheel, a stop for the arm adjustable in location, a platform and a connection between the rock-plate and platform whereby in the movement of the latter the rock-plate is moved to bring the spring against the slide-plate, and to carry the wheel into the path of the finger.

11. In a voting-machine, the combination with register mechanisms, of key-bars adapted when depressed to actuate the register mechanisms said key-bars carrying shoulders, a slide-bar provided with recesses one of the walls of each of which is inclined and arranged in the path of a shoulder whereby in the depression of a key-bar the slide-bar is moved forwardly, a finger carried by the slide-bar, a rock-plate carrying a spring for retracting the slide-bar, a toothed wheel on the rock-plate adapted in the movement of the latter to be brought into the path of the finger to be rotated thereby, and means for limiting the rotation of the wheel.

12. In a voting-machine, the combination of a plurality of register-cases each containing register mechanism key-bars operating when depressed to actuate the register mechanism, mechanism for limiting the number of key-bars to be depressed, slides between the mechanism and key-bars carrying bevel-ended pins, a fixed bar extending transversely across the cases having stop-pins thereon, T-headed sections pivoted on the fixed bar the movement of which is limited by the stop-pins, the heads of the sections having their outer corners beveled and their inner corners transversely beveled for coöperation with the pins on the slides.

13. In a voting-machine, the combination with register-mechanism-operating key-bars having toward their lower ends transversely-projecting pins, a rock-plate, a toothed wheel or segment on the rock-plate, a spring-controlled slide-bar provided with inclined shoulders in the path of the pins, a pawl on the slide-bar adapted to be brought into engagement with the toothed wheel or segment to rotate it, and means for limiting the rotation of the wheel or segment.

14. In a voting-machine, the combination of register-mechanism-operating key-bars each of which is provided in one side with a notch having an inclined side and above said notch with a notch of rectangular form and in the opposite side with rectangular notches in the planes of the aforesaid notches, and a spring-controlled slide-bar coöperating with the notches to prevent the simultaneous depression of two or more key-bars.

15. In a voting-machine, the combination with a plurality of cases each containing a series of register mechanisms, key-bars adapted when depressed to actuate the register mechanisms, slide-bars moved by the depression of the key-bars said slide-bars carrying pins, a spring-controlled slide-bar mounted transversely across the cases having an inclined shoulder in the path of one of the pins and having notches normally opposite to the remaining pins, and operating in its movement through the engagement of its inclined shoulder by the single pin to carry the notches away from the other pins and prevent depression of the remaining key-bars.

16. In a voting-machine, the combination with a plurality of register-mechanism-operating key-bars each provided with notches as described, of a slide-bar in the plane of the bar-notches normally disengaged therefrom to permit the key-bars to be depressed, and means operated from without the machine-casing to move the slide-bar into engagement with the notches to lock the key-bars in elevated position.

17. In a voting-machine, the combination with a plurality of register-mechanism-operating key-bars having the described notches, of a sectional slide-bar in the plane of the notches normally disengaged therefrom to permit the key-bars to be depressed, an auxiliary slide-bar having a shoulder in engagement with the end of the slide-bar, and a locking-bar mounted transversely to the auxiliary bar to have longitudinal and lateral movement, and a key-operated device adapted to move the locking-bar to carry the slide-bar sections into engagement with the key-bar notches to lock the key-bars in elevated position.

18. In a voting-machine, the combination of a plurality of register-mechanism-operating key-bars having the described notches, mechanism for limiting the number of certain of the key-bars to be depressed, a slide-bar adapted to be moved to lock certain other of the key-bars in elevated position, and a slide adapted to be connected with the slide-bar to move therewith and lock the limited key-bars in elevated position.

19. In a voting-machine, the combination of a register-mechanism-operating key-bar provided with a notch, a slide-bar and a locking-bar loosely pivoted at its inner end to permit longitudinal movement thereof, said locking-bar carrying a pin adapted to be brought into engagement with a hole in the slide-bar whereby in the movement of the latter the locking-bar is carried into engagement with the notch in the key-bar to lock the same in elevated position.

20. In a voting-machine, a ticket-chute, a stop normally closing the upper end of the chute, and a support for an inserted ticket adapted to be brought into the path of the ticket coincidentally with the retraction of the stop.

21. In a voting-machine, the combination of a ticket-chute, a pivoted arm carrying at its upper end a stop which normally affords a closure for the chute, and carrying at its lower end a step adapted when the stop is retracted to be moved into the path of a ticket to support the ticket, said arm being moved through connection with a movable platform.

22. In a voting-machine, the combination of a ticket-chute, a pivoted arm carrying at its upper end a stop normally affording a closure for the chute and carrying at its lower end a step affording a support for an inserted ticket, a rock-plate operatively connected with a movable platform, and a rod connecting the rock-plate and arm.

23. In a voting-machine, the combination of a ticket-chute, an arm carrying a stop and a ticket-support, a rock-plate, a rod connecting the arm and rock-plate said arm carrying a stop, a plurality of register-mechanism-operating key-bars, a slide-bar movable to lock the key-bars in elevated position said key-bar having a stop engaging in one direction the stop on the arm, and a beveled projection on the locking-bar arranged in the path of a ticket to be engaged thereby to move the locking-bar into locking position.

24. In a voting-machine, the combination of a ticket-chute, a plurality of register-mechanism-operating key-bars, a spring-controlled slide-bar having recesses which are positioned normally to permit the key-bars to be depressed, a beveled projection on the slide-bar normally in the path of a ticket, whereby the insertion of a ticket causes the slide-bar to be moved to carry the recesses to one side of the key-bars to lock the latter in elevated position.

25. In a voting-machine, the combination of a plurality of register-mechanism-operating key-bars, upper and lower slide-bars coöperating with the key-bars to lock and release the same, a ticket-chute, and a spring-controlled arm carrying a stop for the upper end of the chute, a step on the lower slide-bar affording a support for an inserted ticket, the lower slide-bar operating to move the arm.

26. In a voting-machine, the combination of a plurality of register-mechanism-operating key-bars having notches as described, a locking-bar in the path of the notches, a ticket-chute, a slide forming an extension of the locking-bar, and a beveled projection on the slide in the path of a ticket, whereby upon the insertion of a ticket the slide is moved to carry the slide-bar into engagement with the notches to lock the key-bars in elevated position, and whereby upon the depression of a key-bar the projection affords an immovable stop against the insertion of a ticket.

27. In a voting-machine, the combination of a plurality of register-mechanism-operating key-bars having notches as described, locking-bars in the paths of the notches, slides forming extensions of the locking-bars, shoulders on the slides a spring-controlled longitudinally and laterally movable locking-bar engaging the shoulders on the slides, a beveled projection, and a ticket-chute located to bring the beveled projection into the path of a ticket.

In testimony whereof I affix my signature in presence of two witnesses.

NAPOLEON B. ROSS.

Witnesses:
C. W. DRAKE,
W. G. ROSS.